United States Patent
Sheffer et al.

(10) Patent No.: US 8,078,845 B2
(45) Date of Patent: Dec. 13, 2011

(54) DEVICE AND METHOD FOR PROCESSING INSTRUCTIONS BASED ON MASKED REGISTER GROUP SIZE INFORMATION

(75) Inventors: Noam Sheffer, Tel Aviv (IL); Shlomit Dorani, Beruchin-peduel (IL); Evgeni Ginzburg, Petah Tikva (IL)

(73) Assignee: Freescale Semiconductor, Inc., Austin, TX (US)

(*) Notice: Subject to any disclaimer, the term of this patent is extended or adjusted under 35 U.S.C. 154(b) by 420 days.

(21) Appl. No.: 12/097,598

(22) PCT Filed: Dec. 16, 2005

(86) PCT No.: PCT/IB2005/054291
§ 371 (c)(1),
(2), (4) Date: Jun. 16, 2008

(87) PCT Pub. No.: WO2007/069000
PCT Pub. Date: Jun. 21, 2007

(65) Prior Publication Data
US 2008/0270763 A1    Oct. 30, 2008

(51) Int. Cl.
*G06F 9/30* (2006.01)
(52) U.S. Cl. .................................................. 712/218
(58) Field of Classification Search ................. None
See application file for complete search history.

(56) References Cited

U.S. PATENT DOCUMENTS

| | | | | |
|---|---|---|---|---|
| 4,916,606 A * | 4/1990 | Yamaoka et al. | ........... | 712/218 |
| 5,043,868 A * | 8/1991 | Kitamura et al. | ........... | 712/218 |
| 5,142,631 A * | 8/1992 | Murray et al. | ........... | 712/217 |
| 5,148,529 A * | 9/1992 | Ueda et al. | ........... | 712/218 |
| 5,396,610 A * | 3/1995 | Yoshida et al. | ........... | 711/150 |
| 5,636,353 A * | 6/1997 | Ikenaga et al. | ........... | 712/218 |
| 5,694,565 A * | 12/1997 | Kahle et al. | ........... | 712/216 |
| 5,867,684 A * | 2/1999 | Kahle et al. | ........... | 712/218 |
| 5,941,984 A * | 8/1999 | Mohri et al. | ........... | 712/218 |
| 6,101,596 A * | 8/2000 | Tanaka et al. | ........... | 712/216 |
| 6,101,597 A * | 8/2000 | Colwell et al. | ........... | 712/218 |
| 6,145,097 A | 11/2000 | Moyer et al. | | |
| 6,298,438 B1 | 10/2001 | Thayer et al. | | |
| 6,304,955 B1 * | 10/2001 | Arora | ........... | 712/217 |
| 6,343,359 B1 * | 1/2002 | Col et al. | ........... | 712/245 |
| 6,438,681 B1 * | 8/2002 | Arnold et al. | ........... | 712/216 |
| 6,490,674 B1 * | 12/2002 | Arnold et al. | ........... | 712/216 |

(Continued)

FOREIGN PATENT DOCUMENTS

EP          0455345 B1    5/1997

(Continued)

*Primary Examiner* — Keith Vicary

(57) ABSTRACT

A method and a device for processing instructions based on register group size information includes a pipelined processor, an instruction memory unit and a register file, whereas the pipelined processor includes a write-back unit and an execution unit. The device is characterized by including a controller that is adapted to receive a first register group size information and a first register identification information that define a first group of source registers associated with a first instruction; and to determine an execution related operation of the first instruction in response to the first register group size information, the first register identification information, a second register group size information and a second register identification information. The second register group size information and the second register identification information define a second group of target registers associated with a second instruction. The second instruction is provided to the pipelined processor before the first instruction.

22 Claims, 8 Drawing Sheets

U.S. PATENT DOCUMENTS

| | | |
|---|---|---|
| 6,754,810 B2 | 6/2004 | Elliott et al. |
| 6,901,504 B2 | 5/2005 | Luick |
| 6,981,130 B2 * | 12/2005 | Gupte et al. ................ 712/218 |
| 2002/0108026 A1 * | 8/2002 | Balmer et al. ............... 712/218 |
| 2003/0014614 A1 * | 1/2003 | Jarvis ........................... 712/218 |
| 2003/0154364 A1 * | 8/2003 | Peng et al. ................... 712/218 |
| 2004/0044915 A1 | 3/2004 | Bose et al. |
| 2005/0216707 A1 | 9/2005 | Taylor |

FOREIGN PATENT DOCUMENTS

| | | |
|---|---|---|
| EP | 0918290 A1 | 5/1999 |
| EP | 0547241 B1 | 10/2001 |
| EP | 1385085 A1 | 1/2004 |
| EP | 1024426 B1 | 2/2004 |
| EP | 1416375 A2 | 5/2004 |

* cited by examiner

DEVICE AND METHOD FOR PROCESSING INSTRUCTIONS BASED ON MASKED REGISTER GROUP SIZE INFORMATION

FIELD OF THE INVENTION

The present invention relates to a device and method for processing instructions and especially for performing feed-forward operations.

BACKGROUND OF THE INVENTION

Modern processors are required to execute complex tasks at very high speeds. The introduction of pipelined processor architectures improved the performances of modern processors but also introduced some problems. In a pipelined architecture an execution of an instruction is split to multiple stages. The PowerPC™ processors family of Freescale Semiconductor, Inc. is an example of pipelined processors.

Pipelined processors experience stalls. A stall occurs when an execution of a current instruction depends upon information that is not ready on time.

One method for reducing the amount of stalls and alternatively or optionally decreases the duration of stalls is to perform feed-forwarding. Feed-forwarding usually involves retrieving information before it is sent to a register file. In many cases processed information is both fetched to one of the pipelined units of the processor and in also sent (written-back) to the register file.

Various prior art processors are capable of performing simple feed-forwarding operations. A simple feed-forward operation involves one target register and one source register. Some prior art processors and methods for simple feed-forwarding operations are illustrated in U.S. Pat. No. 6,901,504 of Luick and in U.S. Pat. No. 6,145,097 of Moyer et al., both being incorporated herein by reference.

There is a need to provide an efficient method and device for performing complex feed forward operations.

SUMMARY OF THE PRESENT INVENTION

A method and device for processing instructions, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The following description refers to a method and system for processing instructions, and especially for performing efficient feed-forwarding operations even when consecutive instructions are associated with multiple source registers and multiple target registers.

According to an embodiment of the invention instructions are associated with groups of registers and these groups are represented by register identification information and register group size information. The register group size information can be used to mask the register identification information and to perform comparisons between masked information representative of groups of registers.

Conveniently complex feed-forward operations involve many target registers and/or multiple source registers. Instead of performing a large number of single-register comparisons, the method and device perform few (and even a single) comparison between selectively masked information that represent groups of registers.

Figure 1:
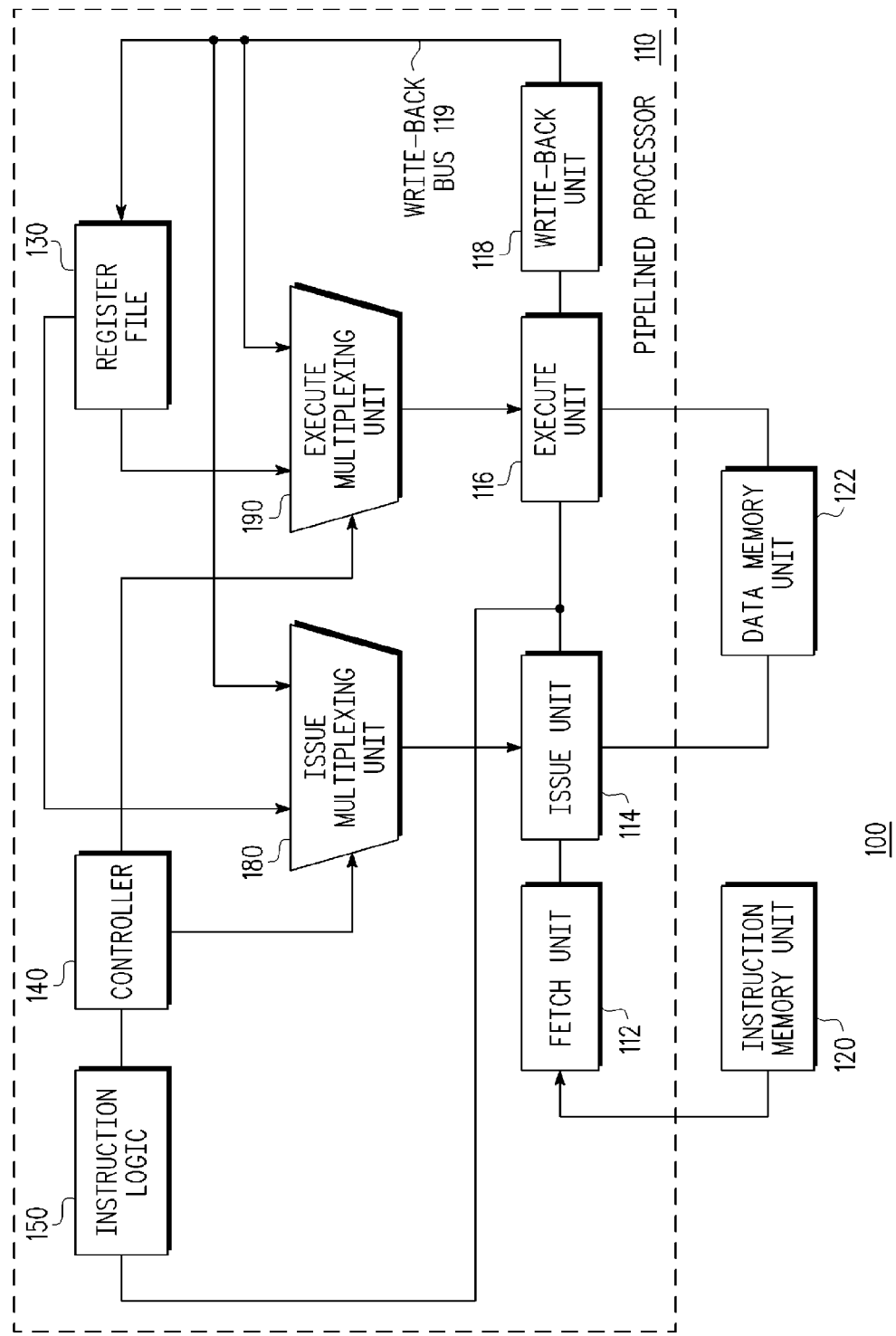
FIG. 1 is a schematic illustration of a device according to an embodiment of the invention.

FIG. 1 illustrates device 100, according to an embodiment of the invention. Device 100 can be an integrated circuit, multiple integrated circuits, a mobile phone, personal data accessory, media player, computer, and the like. Those of skill in the art will appreciate that device 100 can include many components and units that are not illustrated in FIG. 1, as well as include fewer components or other components than those that are illustrated in FIG. 1.

Device 100 includes pipelined processor 110, instruction memory unit 120 and data memory unit 122. The pipelined processor 110 is connected to the instruction memory unit 120 and to the data memory unit 122. It fetches instructions from the instruction memory unit 120 and fetches data from the data memory unit 122.

The pipelined processor 110 includes a fetch unit 112, an issue unit 114, an execute unit 116 and a write-back unit 118. These units are connected in a substantial serial manner to each other, although the write-back unit 118 can provide information to the execute unit 116 and the issue unit 114. It is noted that the issue unit 114 is also referred to as a decode unit.

Pipelined processor 110 also includes a controller 140, an instruction logic 150, a register file 130, an issue multiplexing unit 180 and an execute multiplexing unit 190. It is noted that at least some of these units can be located outside the pipelined processor 110.

The fetch unit 112 is connected to instruction memory unit 120 and to the issue unit 114. The issue unit is further connected to the data memory unit 122, to the instruction logic 150 and to an output of the issue multiplexing unit 180. The execute unit 116 is connected between the issue unit 114 and the write-back unit 118. It is further connected to the output of the execute multiplexing unit 190 and to the data memory unit 122.

The issue multiplexing unit 180 and the execute multiplexing unit 190 are controlled by controller 140. These multiplexing units 180 and 190 select whether to provide information from the register file 130 or (during a feed-forward operation) from the write-back unit 118.

Figure 7:
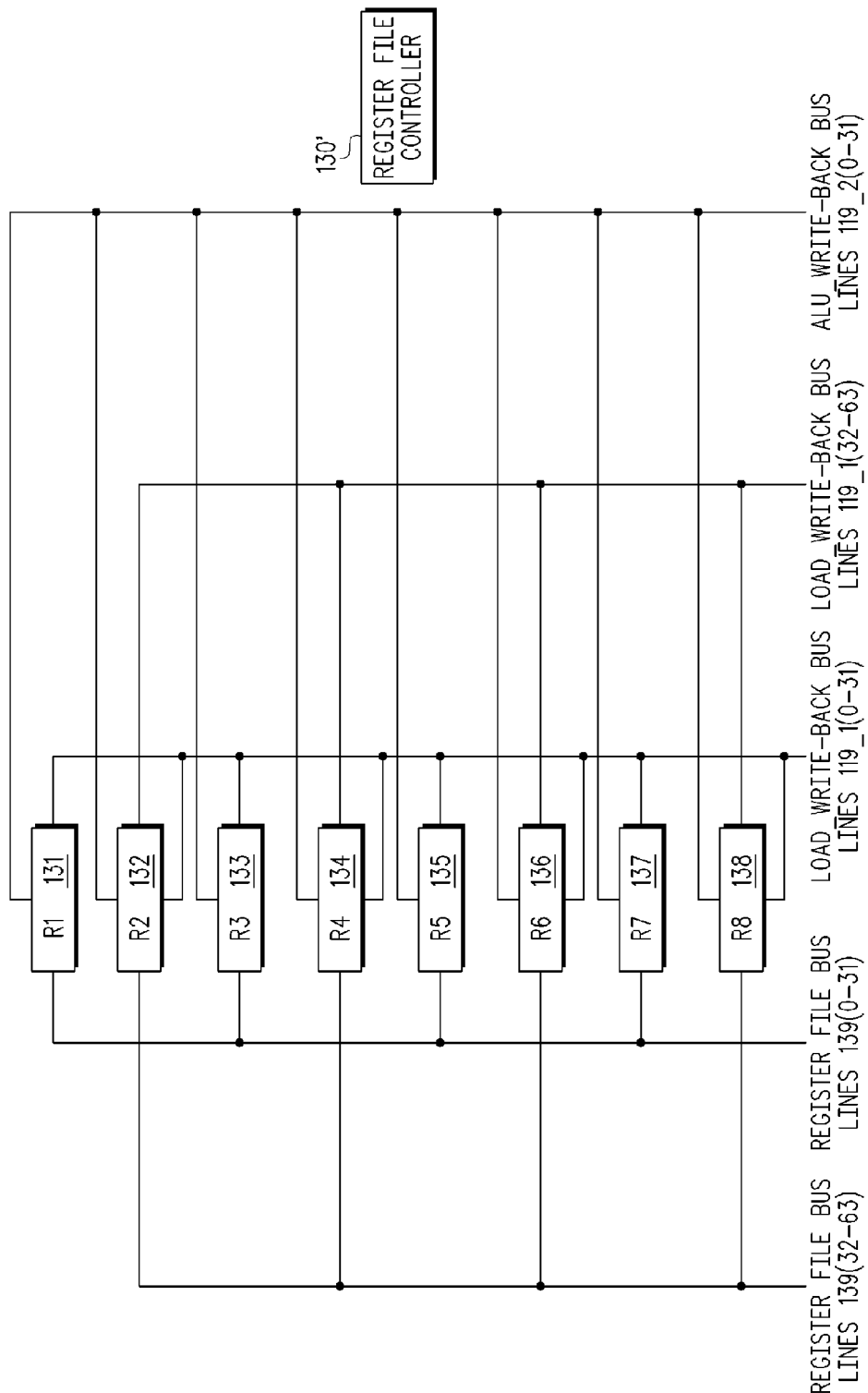
FIG. 7 illustrates a register file, according to an embodiment of the invention.

The register file 130 includes multiple registers, such as registers R1-R8 131-138 of FIG. 7. Some of the instructions that are executed by the pipelined processor can be associated with groups of registers, and especially with groups of registers that includes a sequence of consecutive registers.

For example, a LOAD.B8 instruction or a STORE.B8 instruction involve eight bytes, whereas each register out of R1-R8 131-138 is four bytes long. Thus, each of these instructions is associated with a group of source registers that includes a pair of registers.

Conveniently, each group of registers is represented by register group size information and by register identification information. The register identification information can indicate the address of the first register of the group.

For example, a LOAD.B8 R1, R5 instruction means that four bytes that are pointed by R5 135 and the next four bytes (pointed by the value within R5 plus four) should be loaded to registers R1 131 and R2 132 accordingly. This instruction includes a register group size field (indicates that two registers belong to the group), and register identification information that identifies R1 131.

Yet for another example, a STORE Q R1 instruction means that the least significant sixteen bits of registers R1-R4 131-134 should be send to an external memory.

The controller 140 can determine whether to perform an execution related operation such as a stall or a feed-forward operation based upon the relationship between a group of source registers associated with a first instruction and a group of target registers associated with a second instruction that was provided to the pipelined processor 110 before the first instruction.

Conveniently, the controller 140 is adapted to: (i) receive a second register group size information and a second register identification information that define a second group of source registers associated with a second instruction, (ii) receive a first register group size information and a first register identification information that define a first group of source registers associated with a first instruction, and to (iii) determine an execution related operation of the first instruction in response to the first register group size information, the first register identification information, the second register group size information and the second register identification information.

Controller 140 enables to quickly determine whether to perform a stall operation or a feed forward operation. The determination can include comparing between masked information that represent groups of registers. If, for example a second instruction is associated with two consecutive source registers then the least significant bit of the register identification information is masked and the masked information represents both source registers. If, for example, a first instruction is associated with a group of four source registers then the two least significant bits of the first register identification information are masked.

The masking operation, as well as an arrangement of registers such that consecutive registers are accessed by consecutive register addresses, enable to reduce the number of comparisons, even if consecutive instructions are associated with many registers.

The write-back unit 118 is connected to the register file 130, to the issue multiplexing unit 180 and to the execute multiplexing unit 190 via a write-back bus 119. Conveniently, the write-back bus 119 includes a load write-back bus 119_1 and an ALU write-back bus 119_2. Buses 119_1 and 119_2 are illustrated in FIG. 2 and in FIG. 7.

The load write-back bus 119_1 conveys the results of load operations. The ALU write-back bus 119_2 conveys the results of ALU operations. It is noted that the execute unit 116 is connected to the write-back unit 118 via two buses that correspond to buses 119_1 and 119_2. For simplicity of explanation a single write-back bus 119 is illustrated in FIG. 1.

Figure 2:
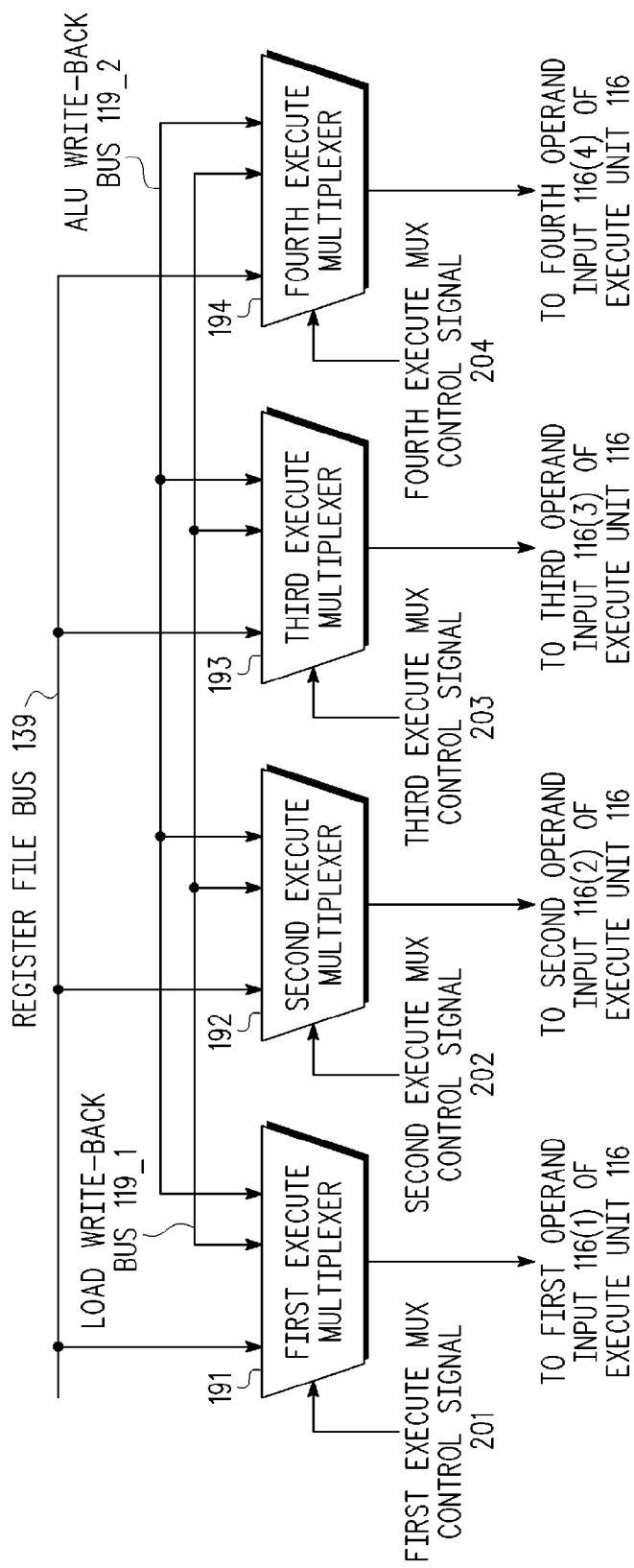
FIG. 2 illustrates an execute multiplexing unit according to an embodiment of the invention.

FIG. 2 illustrates an execute multiplexing unit 190 according to an embodiment of the invention.

It is assumed that the execute unit 116 includes four operand inputs 116(1)-116(4). Each operand input can receive operands from the file register (via file register bus 139) or from the write-back unit 118 (if a feed-forward operation occurs).

Each multiplexer out of first till fourth execute multiplexers 191-194 is connected to the register file bus 139 and to the write-back bus 119. It is noted that each bus can be connected to multiple inputs of each multiplexer, thus allowing selective retrieval of information that is shorter than the bus width.

The first execute multiplexer 191 is controlled by a first execute mux control signal 201. The second execute multiplexer 192 is controlled by a second execute mux control signal 202. The third execute multiplexer 193 is controlled by a third execute mux control signal 203. The fourth execute multiplexer 194 is controlled by a fourth execute mux control signal 204. The control signals are generated by the execute feed-forward unit 144 of controller 140.

Conveniently, the inventors used multiplexers that had six inputs. A first input (32-bit wide) received the file register bus 139. A second input (32-bit wide) received ALU write-back register 119_2 (32-bit wide). Four additional inputs receive four groups (of sixteen lines each) of lines of load write-back bus 119_1. For simplicity of explanation fewer inputs were illustrated.

Figure 3:
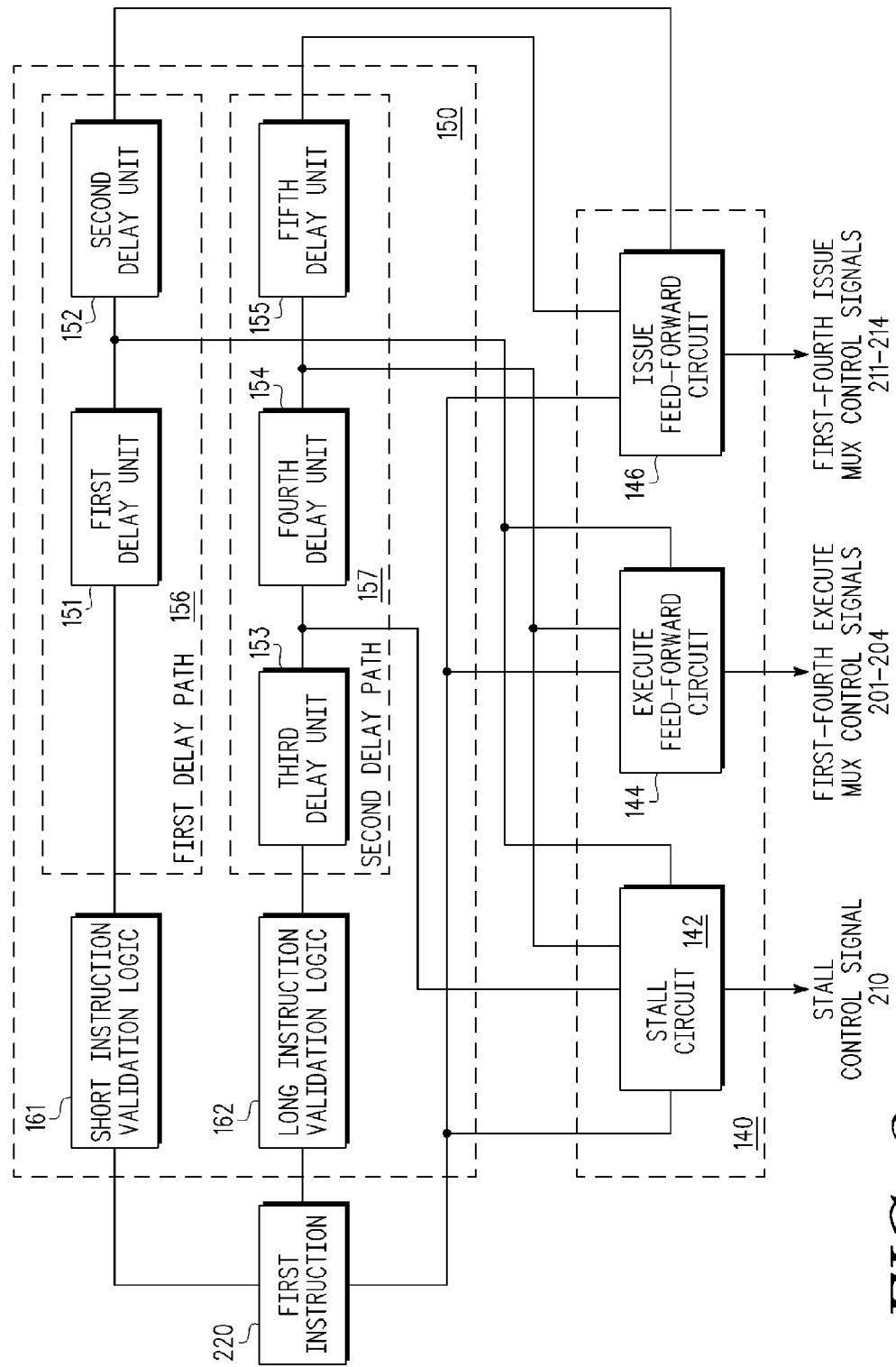
FIG. 3 illustrates a controller and an instruction logic according to an embodiment of the invention.

FIG. 3 illustrates a controller 140 and an instruction logic 150, according to an embodiment of the invention.

The controller 140 includes a stall unit 142, an execute feed-forward unit 144 and an issue feed-forward unit 146. The stall unit 144 determines whether to stall an execution of a currently received instruction. The execute feed-forward unit 144 determines whether the execute unit 116 should fetch operands from the register file or from the write-back bus 119. It sends four control signals (first till fourth execute mux control signals 201-204) to first till fourth execute multiplexers 191-194). The issue feed-forward unit 146 determines whether the issue unit 114 should fetch operands from the register file or from the write-back bus 119. It sends four control signals (first till fourth issue mux control signals 211-214 to first till fourth issue multiplexers that belong to issue multiplexing unit 180).

Each of these units (142-146) receives currently received register identification information and currently received register group size information. In addition these units receive information from previously received instruction. These units selectively mask the register identification information to provide masked information and compare between the masked information. It is noted that if an instruction is associated with one source register or one target register then the register identification information is not masked.

The instruction logic 150 provides to the controller 140 register group size information and register identification information in accordance to an execution process of instructions associated with the register group size information and register identification information. The instruction logic 150 includes multiple delay units that form two delay paths 156 and 157, whereas the length of each delay path is responsive to an execution period of a certain type of instruction.

For example, instruction logic 150 includes a first delay path 156 that emulates the execution of short duration instructions. The first delay path 156 includes first and second delay units 151 and 152 that represent the execution stage and write-back stage of a short instruction such as an instruction that is executed by an arithmetic logic unit.

The second delay path 157 includes a third, fourth and fifth delay units 153-155 that represent two load stages (load address and load data) and a write-back stage of a long instruction.

A current instruction (also referred to as a first instruction) 220 or at least a portion of said instruction (such as first register identification information 231 and first register group size information 232) is provided to short instruction validation logic 161 and to long instruction validation logic 162. Each of these logics determines, according to the content of the first instruction, whether it is a long or a short instruction. If it is a long instruction then the long instruction validation logic 162 associates a valid flag with this instruction, and the short instruction validation logic 161 associates an invalid flag with this instruction. If it is a short instruction then the long instruction validation logic 162 associates an invalid flag with this instruction, and the short instruction validation logic 161 associates a valid flag with this instruction. Then the instruction is provided to delay paths 156 and 157.

It is noted that some instructions can propagate (associated with valid flags) over more than one delay path.

It is further noted that a switching logic can be used instead of two logics 161 and 162. It is further noted that either one of logics 161 and 162 can also prevent the propagation of an invalid instruction information over the delay paths.

It is further noted that if there are more than two instruction types then additional delay paths can be provided. An instruction type is characterized by the duration of its execution.

Those of skill in the art will appreciate that pipelines that have different lengths than four or five cycles can be emulated by delay paths that have different lengths than those of delay paths 156 and 157.

The first delay unit 151 provides information that is delayed by one clock cycle. For convenience of explanation it is referred to as second register group size information 234 and second register identification information 233. This information is valid if during a previous cycle the received instruction was a short instruction.

The second delay unit 152 provides information that is delayed by two clock cycles. For convenience of explanation it is referred to as fourth register group size information 247 and fourth register identification information 246. This information is valid if two cycles ago the received instruction was a short instruction.

The third delay unit 153 provides information that is delayed by one clock cycle. For convenience of explanation it is referred to as sixth register group size information 242 and sixth register identification information 241. This information is valid if during a previous cycle the received instruction was a long instruction.

The fourth delay unit 154 provides information that is delayed by two clock cycles. For convenience of explanation it is referred to as third register group size information 237 and third register identification information 236. This information is valid if two clock cycles ago the received instruction was a long instruction.

The fifth delay unit 155 provides information that is delayed by three clock cycles. For convenience of explanation it is referred to as fifth register group size information 252 and fifth register identification information 251. This information is valid if three clock cycles ago the received instruction was a long instruction.

It is noted that the first instruction 220 can be provided after a decoding sequence occurs.

The execute feed-forward unit 144 is adapted to determine an execution of a feed-forward operation to the execute unit 116. It receives the first, second and third register group size information 232, 234 and 237 and uses it to mask the first, second and third register identification information 231, 233 and 236 to provide first, second and third masked information 238, 235 and 239.

If the first masked information 238 equals a valid information out of the second masked information 235 and the third masked information 239 the execute feed-forward unit 144 sends first till fourth execute feed-forward mux control signals 201-204 that instruct first till fourth execute multiplexers 191-194 to perform a feed-forward operation.

Figure 4:
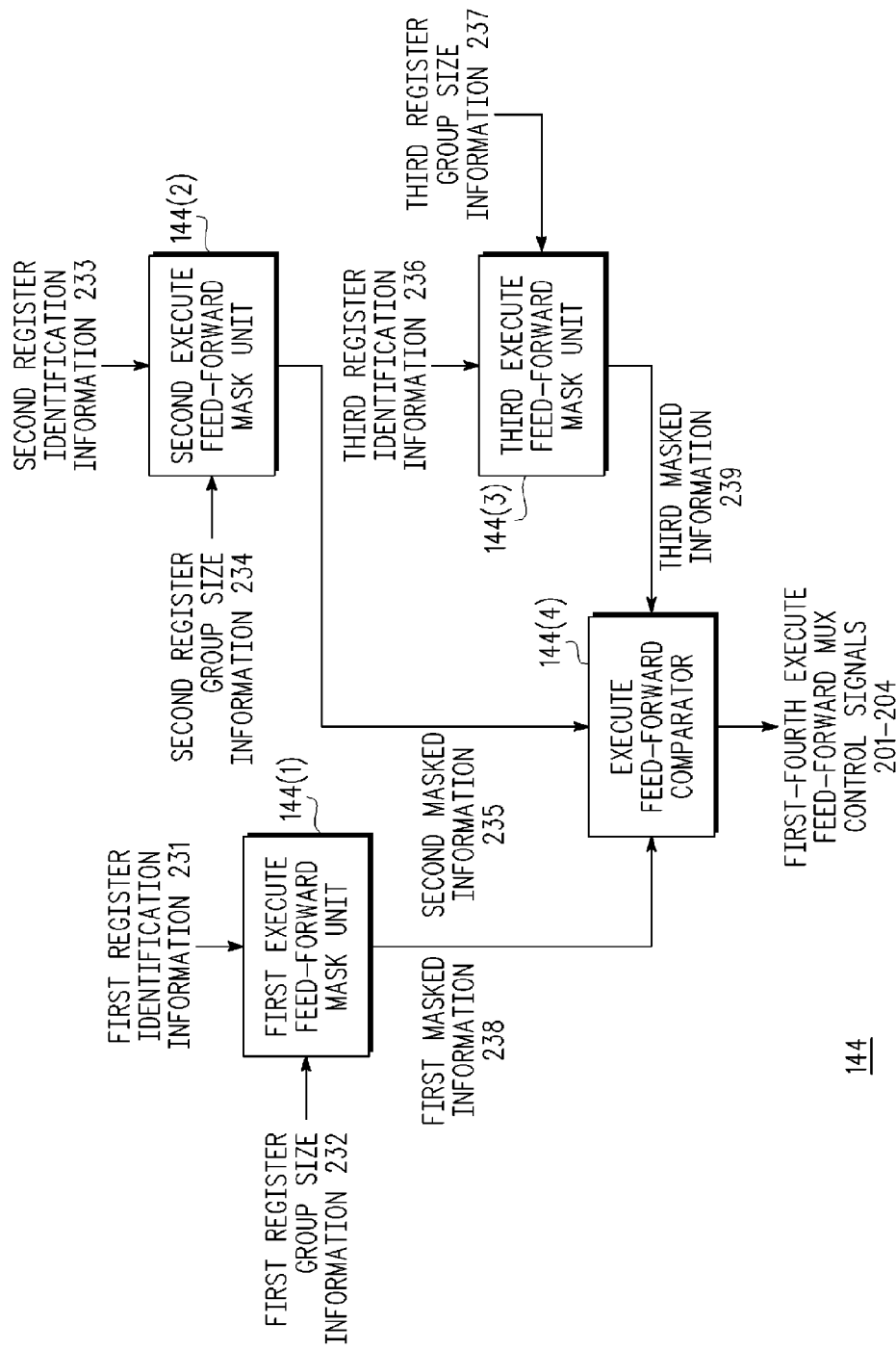
FIG. 4 illustrates an execute feed-forward unit according to an embodiment of the invention.

Referring to FIG. 4, execute feed-forward unit 144 includes a first execute feed-forward mask unit 144(1) that generates the first masked information 238, a second execute feed-forward mask unit 144(2) that generates the second masked information 235 and a third execute feed-forward mask unit 144(3) that generates the third masked information 239. The execute feed-forward comparator 144(4) compares between the masked information and determines the value of first till fourth execute feed-forward mux control signals 201-204.

The stall unit 142 determines whether to stall the execution of the first instruction. It receives the first, second, third and sixth register group size information 232, 234, 237 and 242 and uses it to mask the first, second, third and sixth register identification information 231, 233, 236 and 241 to provide first, second, third and sixth masked information 238, 235, 239 and 243.

If the first masked information 238 equals (i) a valid information out of the second masked information 235 and third masked information 239, and (ii) the masked information 243 then the stall unit 142 sends a stall indication 251.

Figure 5:
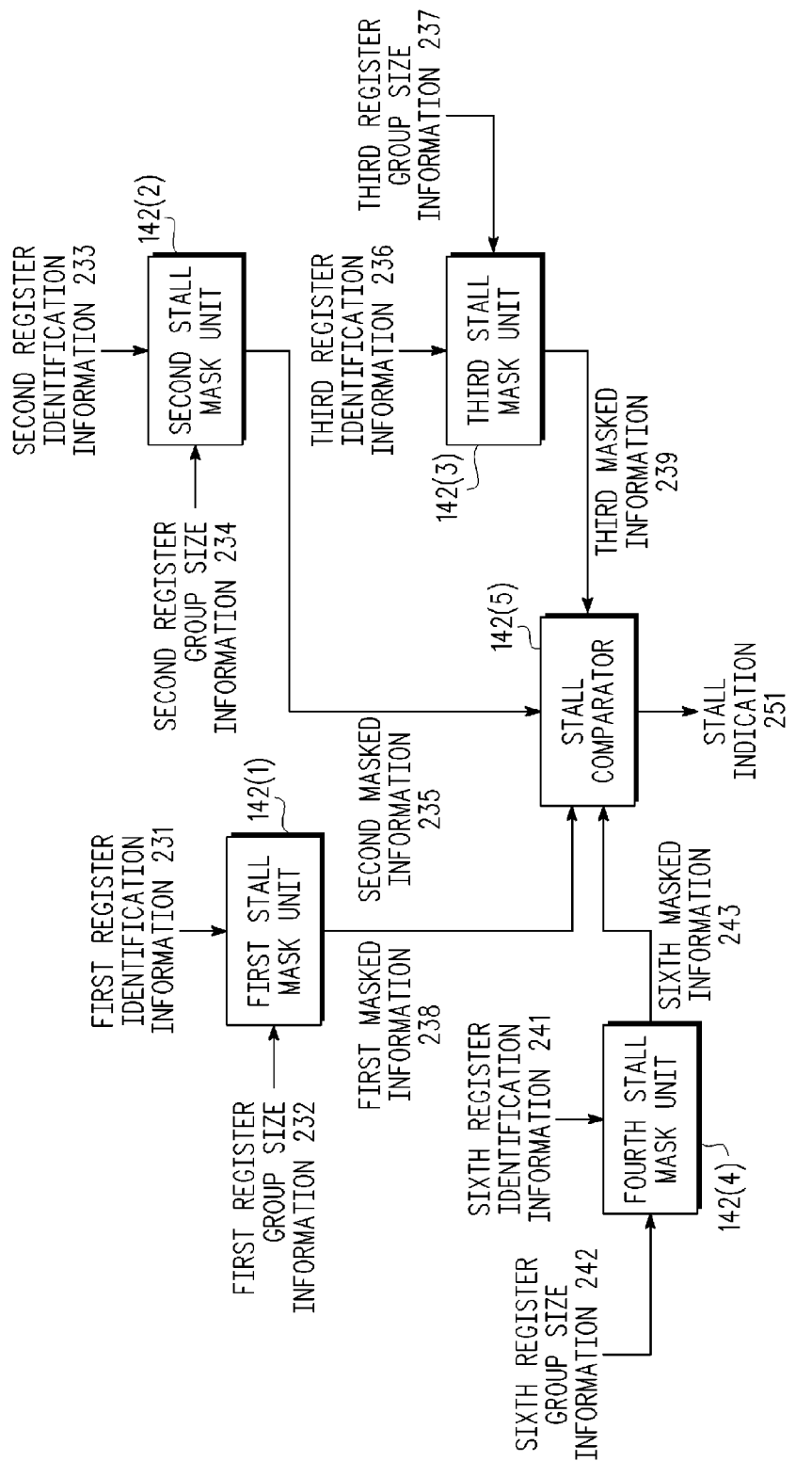
FIG. 5 illustrates a stall unit according to an embodiment of the invention.

Referring to FIG. 5, stall unit 152 includes a first stall mask unit 142(1) that generates the first masked information 238, a second stall mask unit 142(2) that generates the second masked information 235, a third stall mask unit 142(3) that generates the third masked information 239, and a fourth stall mask unit 142(4) that generated the fourth masked information 243. The stall comparator 142(5) compares between the masked information and determines whether to generate a stall indication 251.

The issue feed-forward unit 146 is adapted to determine an execution of a feed-forward operation to the issue unit 114. It receives the first, fourth and fifth register group size information 232, 247 and 252 and uses it to mask the first, fourth and fifth register identification information 231, 246 and 251 to provide first, fourth and fifth masked information 238, 248 and 253.

If the first masked information 238 equals a valid information out of the fourth masked information 248 and the fifth masked information 253 the issue feed-forward unit 146 sends first till fourth issue feed-forward mux control signals 211-214 that instruct first till fourth issue multiplexers of the issue multiplexing unit 180 to perform a feed-forward operation.

Figure 6:
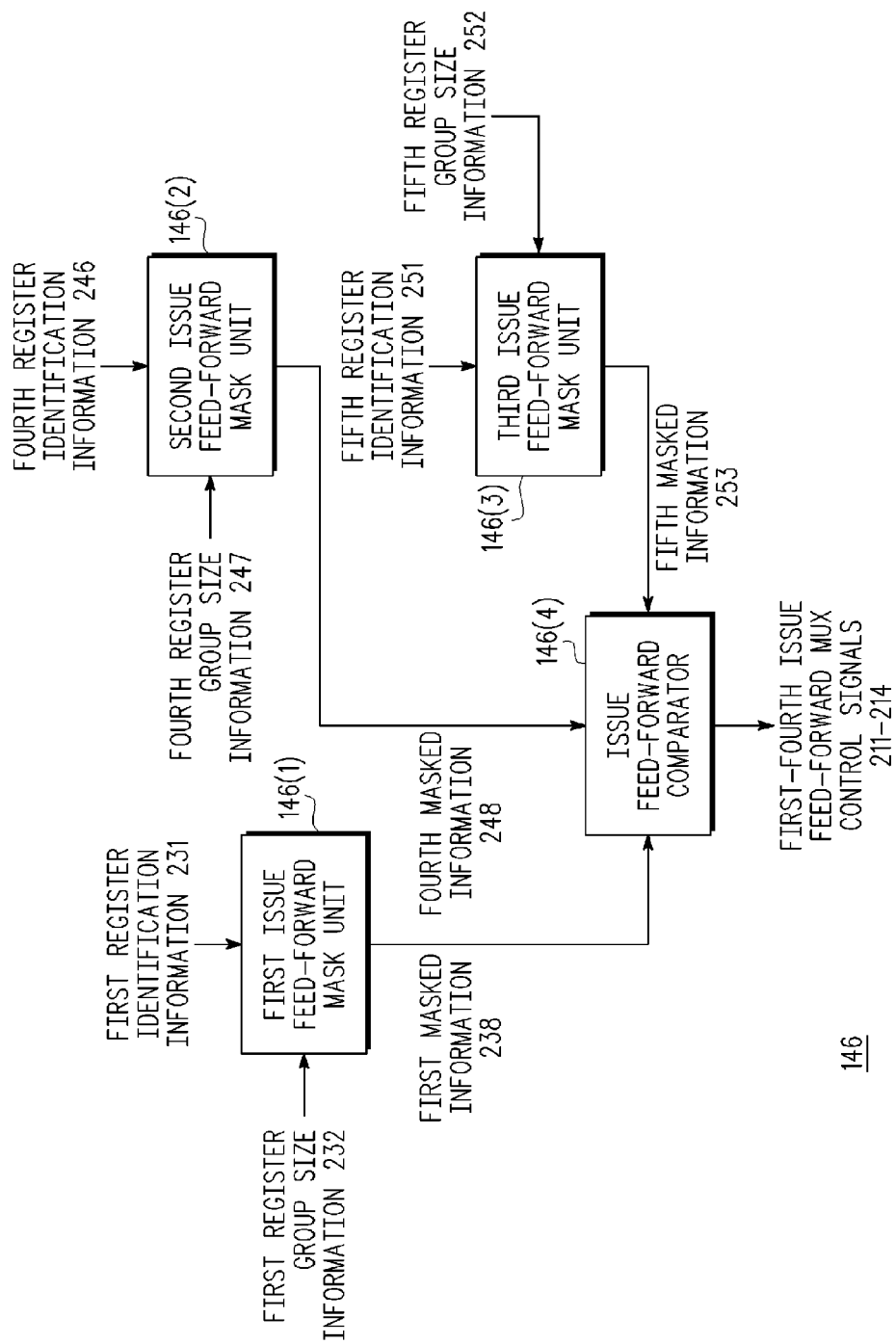
FIG. 6 illustrates an issue feed-forward unit according to an embodiment of the invention.

Referring to FIG. 6, issue feed-forward unit 146 includes a first issue feed-forward mask unit 146(1) that generates the first masked information 238, a second issue feed-forward mask unit 146(2) that generates the fourth masked information 248 and a third issue feed-forward mask unit 146(3) that generates the fifth masked information 253. The issue feed-forward comparator 146(4) compares between the masked information and determines the value of first till fourth issue feed-forward mux control signals 211-214.

FIG. 7 illustrates a register file 130, according to an embodiment of the invention.

Register file 130 includes eight registers R1-R8 131-138, and a register file controller 130'. The register file controller 130' controls the access to the registers. Conveniently, the eight registers have consecutive addresses, starting by R1 131.

Register file 130 includes eight registers that can be addressed by using three address (or register identification information) bits. It is noted that register files that have more registers should be addressed by more than three address bits.

It is assumed that each register is four bytes long and that the odd registers R1 131, R3 133, R5 135 and R7 137 are connected to the most significant lines of the load write-back bus 119_1 (load write-back bus lines 119_1(0)-119_1(31)) and to the most significant lines of the register file bus 139 (register file bus lines 139(0)-139(31)). The even registers R2 132, R4 134, R6 136 and R8 138 are connected to the least significant lines of the load write-back bus 119_1 (load write-back bus lines 119_1(32)-119_1(63)), to the most significant lines of the load write-back bus 119_1 (load write-back bus lines 119_1(0)-119_1(31)), and to the least significant lines of the register file bus 139 (register file bus lines 139(32)-139 (63)).

All registers are connected to the ALU write-back bus 119_2.

R1 131 is addressed by register identification information 000, R2 132 is addressed by register identification information 001, R3 133 is addressed by register identification information 010, R4 134 is addressed by register identification information 011, R5 135 is addressed by register identification information 100, R6 136 is addressed by register identification information 101, R7 137 is addressed by register identification information 110 and R8 138 is addressed by register identification information 111.

When an instruction is associated with R1-R4 131-134 or R5-R8 135-138 then the two least significant bits of the register identification information should be masked when controller 140 determines whether to perform a stall operation or a feed-forward operation.

When an instruction is associated with R1-R2, R3-R4, R5-R6 or R7-R8 then the least significant bit of the register identification information should be masked when controller 140 determines whether to perform a stall operation or a feed-forward operation.

Those of skill in the art will appreciate that if the register identification information is assigned in a different manner then the masking operation can be adapted accordingly.

It is noted that this masking scheme imposes various limitations upon multiple register instructions (for example addressing four registers that can start by R1 or R5), but these limitations can be overcome by using more complex masking schemes. Various prior art masking schemes can be applied to provide more flexible usage of registers.

TABLE 1 provides various examples of the signals provided by the issue feed-forward unit 146. Its first column includes a previous instruction, its second column illustrates the current instruction and the third column illustrates the first till fourth issue mux control signals 211-214. A default signal ("d") means that no feed-forwarding is required and that the operand is retrieved from register file 130. Other values indicate the lines of the write-back line 119 from which to retrieve the information. Conveniently, each multiplexer (such as multiplexers 191-194) includes at least one input for each bus out of write-back bus 119 and register file bus 139. Multiple inputs enable to select one group of bus lines out of multiple groups of bus lines. If, for example each group of two bytes long then a multiplexer can include up to four inputs per the eight-byte wide buses.

Symbol "R" (without any following number) denotes any register from the register file. Symbol "Q" denotes a QUAD registers operation. Symbol "B8" denotes a double register operation. Symbol "d" indicates a retrieval of information from register file 130.

TABLE 1

| Previous instruction | Current instruction | First till fourth issue mux control signals 211-214 |
|---|---|---|
| LOAD R1, R | STORE R1, R | 000, d, d, d |
| LOAD R1, R | STORE.B8 R1, R | 000, d, d, d |
| LOAD R1, R | STORE.Q R1, R | 000, d, d, d |
| LOAD R2, R | STORE R1, R | 000, d, d, d |
| LOAD R2, R | STORE.B8 R1, R | d, 000, d, d |
| LOAD R2, R | STORE.Q R1, R | d, 000, d, d |
| LOAD R3, R | STORE R3, R | 000, d, d, d |
| LOAD R3, R | STORE.B8 R3, R | 000, d, d, d |
| LOAD R3, R | STORE.Q R1, R | d, d, 000, d |
| LOAD R4, R | STORE R4, R | 000, d, d, d |
| LOAD R4, R | STORE.B8 R3, R | d, 000, d, d |
| LOAD R4, R | STORE.Q R1, R | d, d, d, 000 |
| LOAD.B8 R1, R | STORE R1, R | 00S[4], d, d, d |
| LOAD.B8 R1, R | STORE R2, R | 00S[4], d, d, d |
| LOAD.B8 R1, R | STORE.B8 R1, R | 00S[4], d, d, d |
| LOAD.B8 R1, R | STORE.Q R1, R | 000, 001, d, d |
| LOAD.B8 R3, R | STORE R3, R | 00S[4], d, d, d |
| LOAD.B8 R3, R | STORE R4, R | 00S[4], d, d, d |
| LOAD.B8 R3, R | STORE.B8 R3, R | 00S[4], 001, d, d |
| LOAD.B8 R3, R | STORE.Q R1, R | d, d, 000, 001 |
| LOAD.Q R1, R | STORE R1, R | 100, d, d, d |
| LOAD.Q R1, R | STORE R2, R | 101, d, d, d |
| LOAD.Q R1, R | STORE R3R | 110, d, d, d |
| LOAD.Q R1, R | STORE R4, R | 111, d, d, d |
| LOAD.Q R1, R | STORE.B8 R1, R | 100, 101, d, d |
| LOAD.Q R1, R | STORE.B8 R3, R | 110, 111, d, d |
| LOAD.Q R1, R | STORE.Q R1, R | 100, 101, 110, 111 |

TABLE 2 illustrates the execution stages of an exemplary sequence of instructions: (I1) LOAD.Q R5,R4; (I2) SUB R1, R1; (I3) ADD R2, R2 and (I4) STORE.B8 R7, R3.

Each column of TABLE 2 illustrates one clock cycle. It is noted that at clk5 an issue feed-forward operation occurs. Instruction I4 requires the content of registers R7 and R8. The content is ready at the end of clk4. The feed-forward operation of both registers occurs in parallel to the write-back to the register file 130.

TABLE 2

| Clk1 | Clk2 | Clk3 | Clk4 | Clk5 | Clk6 | Clk7 |
|---|---|---|---|---|---|---|
| I1 fetch | I1 issue | I1 load address | I1 load data | I1 write-back | | |
| | I2 fetch | I2 issue | I2 execute | I2 write-back | | |
| | | I3 fetch | I3 issue | I3 execute | I3 write-back | |
| | | | I4 fetch | I4 issue | I4 execute | I4 write-back |
| | | | | Issue feed-forward of R7 and R8 | | |

TABLE 3 illustrates the execution stages of an exemplary sequence of instructions: (I1) SUB R1, R2; (I2) ADD R7, R8 and (I3) ADD R4, R1.

Each column of TABLE 3 illustrates one clock cycle. It is noted that at clk4 an issue feed-forward operation occurs. Instruction I3 requires the content of register R1. The content is ready at the end of clk3. The feed-forward operation occurs in parallel to the write-back to the register file 130.

TABLE 3

| Clk1 | Clk2 | Clk3 | Clk4 | Clk5 | Clk6 |
|---|---|---|---|---|---|
| I1 fetch | I1 issue | I1 execute | I1 write-back | | |
| | I2 fetch | I2 issue | I2 execute | I2 write-back | |
| | | | I3 fetch | I3 issue | I3 execute | I3 write-back |
| | | | | Issue feed-forward of R1 | |

TABLE 4 illustrates the execution stages of an exemplary sequence of instructions: (I1) LOAD.B8 R1, R5 and (I2) LOAD R7, R2.

Each column of TABLE 4 illustrates one clock cycle. It is noted that at clk3 and at clk4 a stall operation occurs as I1 does not update the content of its target registers R1 and R2 till the end of ck4. At clk5 an issue feed-forward operation occurs (of R2 that is needed as address of the second LOAD). The feed-forward operation occurs in parallel to the write-back to the register file 130.

TABLE 4

| Clk1 | Clk2 | Clk3 | Clk4 | Clk5 | Clk6 | Clk7 |
|---|---|---|---|---|---|---|
| I1 fetch | I1 issue | I1 load address | I1 load data | I1 write-back | | |
| | I2 fetch | Stall | stall | I2 issue | I2 execute | I2 write-back |
| | | Stall-R1 is not ready | Stall-R1 is not ready | Issue feed-forward of R1 | | |

TABLE 5 illustrates the execution stages of an exemplary sequence of instructions: (I1) LOAD.Q R5,R20; (I2) SUB R3, R4; (I3) ADD R1, R8.

Each column of TABLE 5 illustrates one clock cycle. The content of R8 is needed by I3. The content is ready at the end of clk4. At clk5 an execute feed-forward operation occurs (of R8). The feed-forward operation occurs in parallel to the write-back to the register file 130.

TABLE 5

| Clk1 | Clk2 | Clk3 | Clk4 | Clk5 | Clk6 |
|---|---|---|---|---|---|
| I1 fetch | I1 issue | I1 load address | I1 load data | I1 write-back | |
| | I2 fetch | I2 issue | I2 execute | I2 write-back | |
| | | | I3 fetch | I3 issue | I3 execute | I3 write-back |
| | | | | Execute feed-forward of R8 | |

Figure 8:
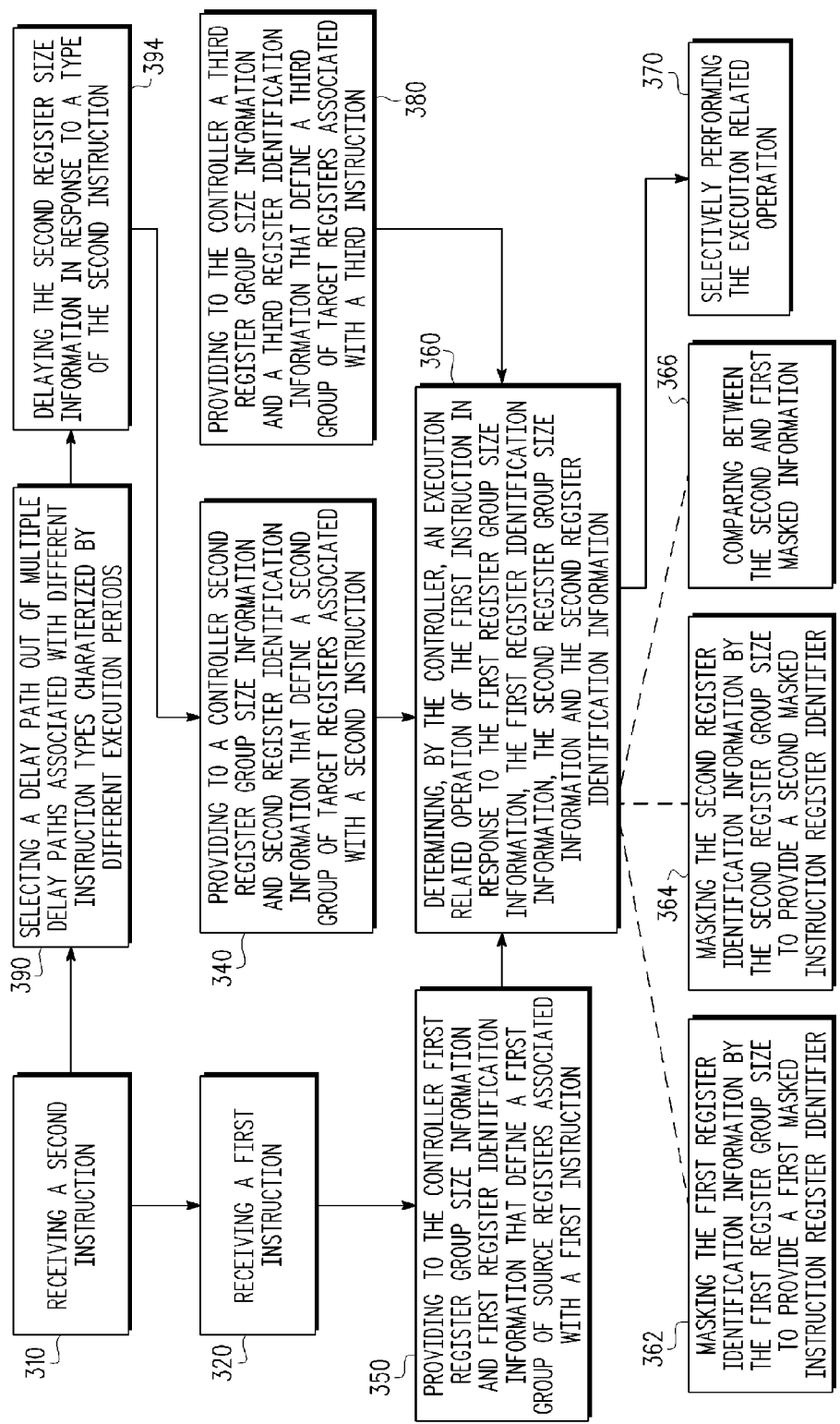
FIG. 8 illustrates a method for processing instructions, according to an embodiment of the invention.

FIG. 8 illustrates a method 300 for processing instructions, according to an embodiment of the invention.

For convenience of explanation the following description refers to an execution of two instructions. Those of skill in the art will appreciate that the number of instructions that can affect each other can differ than two, thus the determination stage is responsive to more than two instructions. In addition, various stages are explained in reference to device 100. This reference provides exemplary non-limiting examples of the execution of method 300.

Method 300 starts by stage 310 of receiving a second instruction.

Conveniently, the receiving is followed by initializing a pipelined execution process of the second instruction or continuing the pipelined execution process of the second instruction. It is noted that the reception can be regarded as a part of the pipelined execution session. The pipelined execution process can include a fetching stage, a decoding (or issue) stage, one or more load stages and a write-back stage, and an execution stage, some of these stages or a combination of more stages. The execution stage can be executed by an arithmetic logic unit but this is not necessarily so. The one or more load stages are characteristic of load or store instructions, but this is not necessarily so.

Stage 310 can include fetching the second instruction (for example fetching the instruction from instruction memory unit 120 by fetch unit 112) and providing the fetched instruction to an issue unit such as issue unit 114 of FIG. 1.

Stage 310 is followed by stages 320 and 340. Stage 320 includes receiving a first instruction. The receiving is followed by initializing a pipelined execution process of the second instruction or continuing the pipelined execution process of the first instruction.

Stage 320 can include fetching the first instruction and even providing the fetched instruction to an issue unit such as issue 114 of FIG. 1.

It is noted that when stage 320 occurs the second instruction can be processed by the issue unit 114, the execute unit 116, and the like. If the results (for example processed operands) of the execution of the second instruction were already sent to the write-back unit 118 or written to the register file 130 then the execution of the second instruction will not cause the method to stall or to perform a feed-forward operation.

Stage 340 includes providing to a controller second register group size information and second register identification information that define a second group of target registers associated with a second instruction.

Referring to the example set forth in previous drawings, instruction logic 150 provides to controller 140 information via its delay units 151-155.

Conveniently, stage 340 of providing to the controller second register group size information and second register identification information includes timing the provision of this information in accordance to an execution process of the first instruction. The timing can be dictated by the delay units 151-155.

Conveniently, stage 340 is preceded by stage 390 of selecting a delay path out of multiple delay paths associated with different instruction types characterized by different execution periods. Stage 340 is also preceded by stage 394 of delaying the second register size information in response to a type of the second instruction. Stage 394 follows stage 390.

Referring to FIG. 3, the selection is made by the short and long instruction validation logics 161 and 162 and a valid instruction is sent to the first or second delay paths 156 and 157.

Stage 320 is followed by stage 350 of providing to the controller first register group size information and first register identification information that define a first group of source registers associated with a first instruction. Referring to the example set forth in FIG. 3, this information (referred to as first instruction 220) is provided to controller 140.

Stage 350 is followed by stage 360 of determining, by the controller, an execution related operation of the first instruction in response to the first register group size information, the first register identification information, the second register group size information and the second register identification information.

Referring to the example set forth in FIG. 3, controller 140 includes three units—stall unit 142, execute feed-forward unit 144 and issue feed-forward unit 146. These units determine when to perform stall operations and feed-forward operations.

Conveniently, stage 360 includes determining an identity of write-back bus lines that convey valid feed-forward information. Referring to FIG. 7, the write-back bus 119 and the register file bus 139 include sixty-four lines, as they are eight bytes wide. In various cases the operands are smaller. For example, a QUAD operation can operate on the least significant byte of each register. Thus, according to the requested operation and to the identity of the involved registers the controller 140 may also indicate which lines of the relevant bus should be read.

Conveniently, stage 360 includes determining a relationship between the second group of target registers and the first group of source registers. If there is an overlap between these groups of registers then a stall operation and/or a feed-forward operation may be required.

Conveniently, stage 360 includes stage 362 of masking the first register identification information by the first register group size to provide a first masked instruction register identifier. Stage 362 is followed by stage 364 of masking the second register identification information by the second register group size to provide a second masked instruction register identifier. Stage 364 is followed by stage 366 of comparing between the second and first masked information.

Stage 360 is followed by stage 370 of selectively performing the execution related operation. Conveniently, stage 370 includes stalling an execution of the first instruction or performing a feed-forward operation. It is noted that stage 370 may include continuing or even finishing the pipelined execution process of the first instruction without stalling it or without performing a feed-forward operation.

Stage 370 can include selectively performing a feed-forward operation to a decoding unit of a pipelined processor and selectively performing a feed-forward operation to an execution unit of the pipelined processor. Referring to the example set froth in FIG. 3, the issue feed-forward unit 146 controls feed-forward operation to the issue unit 114. The execute feed-forward unit 144 controls a feed-forward operation to the execute unit 116.

Conveniently, stage 360 of determining is responsive to additional information relating to more than two instructions.

For example, the method can include stage 380 of providing to the controller a third register group size information and a third register identification information that define a third group of target registers associated with a third instruction. In this case stage 360 can be further responsive to the third register group size information and to the third register identification information.

Referring to the example set forth in FIG. 3, each unit out of stall unit 142, execute feed-forward unit 144 and issue feed-forward unit 146 compares between information associated with the first instruction and valid information that can be delayed by one or more cycles. The information can be provided from two delay paths.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

The invention claimed is:

1. A device comprising:
   a pipelined processor;
   an instruction memory unit; and
   a register file;
   wherein the pipelined processor comprises:
      a write-back unit; and
      an execution unit;
   a controller that is adapted to receive a first register group size information and a first register identification information that define a first group of source registers associated with a first instruction, to mask the first register identification information, and to determine an execution related operation of the first instruction in response to the first register group size information, the masked first register identification information, a second register group size information and a second register identification information, wherein a total number of least significant bits masked in the masked first register identification information is less than a total number of source registers associated with the first instruction;
   wherein the second register group size information and the second register identification information define a second group of target registers associated with a second instruction; and
   wherein the second instruction is provided to the pipelined processor before the first instruction.

2. The device according to claim 1 wherein the execution related operation is a stall operation.

3. The device according to claim 1, wherein the execution related operation comprises a receiving at least one result of an execution of the second instruction from the write-back unit.

4. The device according to claim 1, wherein the controller is adapted to determine the execution related operation in response to a relationship between the second group of target registers and the first group of source registers.

5. The device according to claim 1, wherein the controller is adapted to mask the second register identification information by the second register group size information to provide a second masked instruction register identifier; and to compare between the second and first masked register identification information.

6. The device according to claim 1, wherein the controller is further adapted to receive a third register group size information and a third register identification information that define a third group of target registers associated with a third instruction, and to determine an execution related operation of the first instruction in response to the first and second register group size information, the first and second register identification information, the third register group size information and the third register identification information;
   wherein the third register group size information and the third register identification information define a third group of target registers associated with a third instruction; and
   wherein the third instruction is provided to the pipelined processor before the first instruction.

7. The device according to claim 1, wherein the controller is coupled to an instruction logic that provides to the controller register group size information and register identification information in accordance to an execution process of instructions associated with the register group size information and the register identification information.

8. The device according to claim 1, wherein the instruction logic comprises multiple delay paths, wherein a length of each delay path is responsive to an execution period of a certain type of instruction; and wherein the instruction logic provides to the controller delayed register group size information and delayed register identification information.

9. The device according to claim 1, wherein the controller comprises a stall unit, and a feed-forward unit;
   wherein the stall unit is adapted to determine an execution of a stall operation; and
   wherein the feed-forward unit is adapted to determine an execution of a feed-forward operation.

10. The device according to claim 1, wherein the pipelined processor further comprises a decoding unit and wherein the controller controls a provision of information to the execution unit and to the decoding unit.

11. The device according to claim 1, wherein the pipelined processor is adapted to determine an identity of write-back bus lines that convey valid feed-forward information.

12. A method for processing instructions, the method comprises:
   receiving a second instruction and initializing a pipelined execution process of the second instruction;
   receiving a first instruction and initializing a pipelined execution process of the first instruction;
   providing to a controller a second register group size information and a second register identification information that define a second group of target registers associated with the second instruction;
   providing to the controller a first register group size information and a first register identification information that define a first group of source registers associated with the first instruction;
   masking, by the controller, the first register identification information, wherein a total number of least significant bits masked in the masked first register identification information is less than a total number of source registers associated with the first instruction;
   determining, by the controller, an execution related operation of the first instruction in response to the first register group size information, the masked first register identification information, the second register group size information and the second register identification information; and
   performing the execution related operation;
   wherein the pipelined execution process of the first instruction comprises the execution related operation.

13. The method according to claim 12, wherein the executing comprises performing a feed-forward operation.

14. The method according to claim 12, wherein the determining comprises determining a relationship between the second group of target registers and the first group of source registers.

15. The method according to claim 12, wherein the determining comprises:
   masking the second register identification information by the second register group size information to provide a second masked register identifier; and
   comparing between the second and first masked register identification information.

16. The method according to claim 12, further comprising providing to the controller a third register group size information and a third register identification information that define a third group of target registers associated with a third instruction; and
   wherein the determining is further responsive to the third register group size information and to the third register identification information.

17. The method according to claim 12, wherein the providing to the controller the second register group size information comprises timing the providing in accordance to an execution process of the first instruction.

18. The method according to claim 12, wherein the providing to the controller the second register group size information is preceded by selecting a delay path out of multiple delay paths associated with different instruction types characterized by different execution periods; and delaying the second register group size information in response to a type of the second instruction.

19. The method according to claim 12, wherein the performing comprises performing a stall operation by a stall unit, and performing a feed-forward operation by a feed-forward unit.

20. The method according to claim 12, wherein the performing comprises selectively performing feed-forwarding to a decoding unit of a pipelined processor and selectively performing feed-forwarding to an execution unit of the pipelined processor.

21. The method according to claim 12, wherein the determining comprises determining an identity of write-back bus lines that convey valid feed-forward information.

22. A device comprising:
   a pipelined processor;
   an instruction memory unit; and
   a register file;
   wherein the pipelined processor comprises:
      a write-back unit; and
      an execution unit;
   a controller that is adapted to receive a first register group size information and a first register identification information that define a first group of source registers associated with a first instruction, and to determine an execution related operation of the first instruction in response to the first register group size information, the first register identification information, a second register group size information and a second register identification information, and the controller is adapted to mask the first register identification information by the first register group size to provide a first masked instruction register identifier, to mask the second register identification information by the second register group size to provide a second masked instruction register identifier, and to compare between the second masked instruction register identifier and the first masked instruction register identifier, wherein a total number of least significant bits masked in the first masked instruction register identifier is less than a total number of source registers associated with the first instruction, and a total number of least significant bits masked in the second masked instruction register identifier is less than a total number of target registers associated with the second instruction;
   wherein the second register group size information and the second register identification information define a second group of target registers associated with a second instruction; and
   wherein the second instruction is provided to the pipelined processor before the first instruction.

* * * * *

UNITED STATES PATENT AND TRADEMARK OFFICE
CERTIFICATE OF CORRECTION

PATENT NO.        : 8,078,845 B2                                       Page 1 of 1
APPLICATION NO.   : 12/097598
DATED             : December 13, 2011
INVENTOR(S)       : Noam Sheffer et al.

It is certified that error appears in the above-identified patent and that said Letters Patent is hereby corrected as shown below:

Column 13, Line 17, please change "decoding unitand" to --decoding unit and--

Signed and Sealed this
Thirteenth Day of March, 2012

David J. Kappos
*Director of the United States Patent and Trademark Office*